Figure 1:
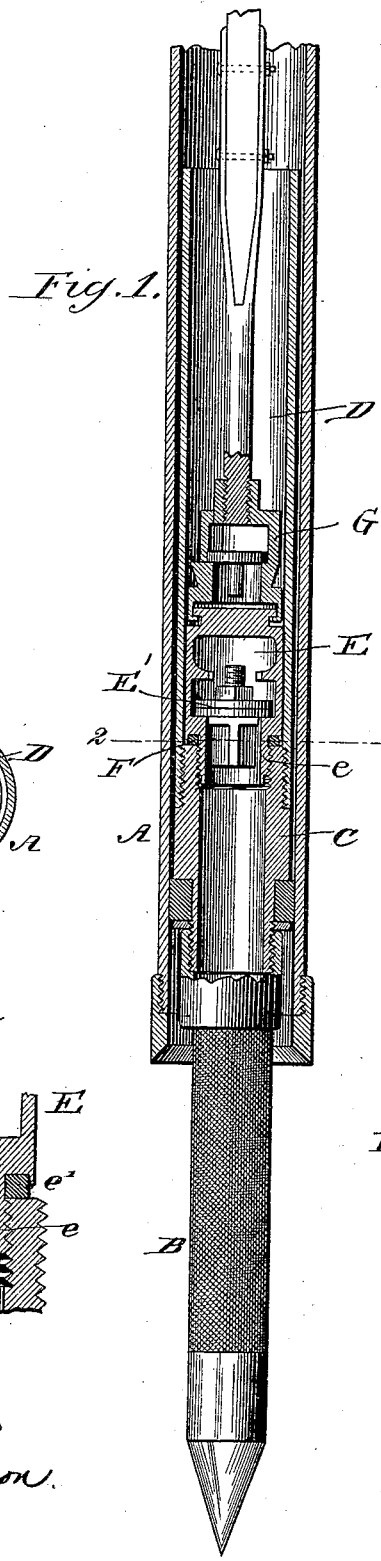

(No Model.)

A. CAMERON & T. G. CHAPMAN.
TUBULAR WELL.

No. 449,771. Patented Apr. 7, 1891.

Witnesses
W. Rossiter
H. Dickinson

Inventors
Arthur Cameron
Thomas G. Chapman
By Chas. G. Page
Atty.

UNITED STATES PATENT OFFICE.

ARTHUR CAMERON, OF KALAMAZOO, MICHIGAN, AND THOMAS G. CHAPMAN, OF CHICAGO, ILLINOIS, ASSIGNORS TO FREDERICK C. AUSTIN, OF CHICAGO, ILLINOIS.

TUBULAR WELL.

SPECIFICATION forming part of Letters Patent No. 449,771, dated April 7, 1891.

Application filed June 11, 1888. Serial No. 276,761. (No model.)

*To all whom it may concern:*

Be it known that we, ARTHUR CAMERON, a citizen of the United States, residing at Kalamazoo, in the county of Kalamazoo and State of Michigan, and THOMAS G. CHAPMAN, a subject of the Queen of Great Britain, residing at Chicago, in the county of Cook and State of Illinois, have invented a certain new and useful Improvement in Tubular Wells, of which the following is a specification.

Our invention relates to tubular wells of that class in which a plunger-cylinder and a check-valve are let down and secured within the main well-tube in order that a valved piston or plunger may be operated within the plunger-cylinder for the purpose of pumping up the water.

The object of our invention is to provide reliable, simplified, and otherwise efficient and improved means for forming a secure and tight connection between a joint that is provided with a seat for a check-valve and a coupling which serves to connect the plunger-cylinder with the strainer-tube, and to dispense with various expensive and undesirable devices and constructions which have been heretofore employed at such point in tubular wells of the aforesaid general character.

In carrying out our invention the joint, which is provided with a check-valve and seat therefor, is at its lower end provided with an externally-threaded neck which is adapted to screw into the upper end of a coupling that serves to connect the plunger-cylinder with a strainer-point. At the point of junction between said threaded neck and the body of the check-valve joint an annular packing is fitted upon the neck, so as to lie against the annular shoulder, which is at such point formed by the reduction that is made in the size of the check-valve joint to provide the said neck. When the neck of the check-valve joint is screwed into the coupling, the packing will be compressed between the shoulder of the check-valve joint and the upper end of the coupling that is within the lower portion of the plunger-cylinder, whereby a tight and exceedingly simple arrangement of joint or connection between the check-valve joint and the coupling is attained.

As a means for retaining the packing in place against the annular shoulder of the coupling-joint when the latter is unscrewed from the coupling and for preventing the packing from being drawn off the neck by reason of any tendency it may have to stick to the coupling, the annular shoulder of the check-valve joint is provided with an annular groove, into which a portion of the packing is forced, the mode of applying the packing being to first fit it upon the neck, and then by the application of suitably-applied pressure force a portion of the material of which the packing is composed into the annular groove. In this way, while the visible portion of the packing may present the appearance of a flat annular washer, it will upon inspection be found to have a portion of its thickness crowded into the annular groove.

Figure 2:
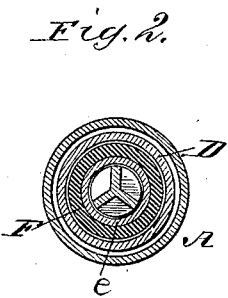
Figure 5:
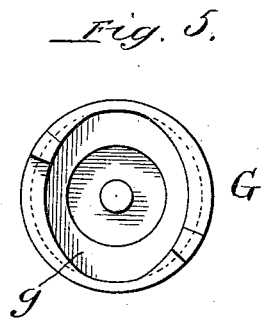
Figure 3:
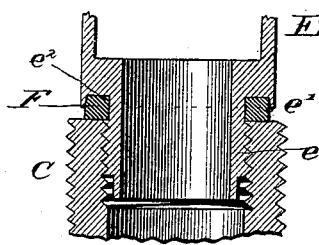
Figure 4:
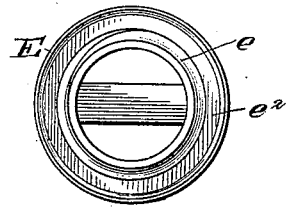

In the drawings, Figure 1 represents in vertical central section the lower portion of a tubular well containing our improvement. Fig. 2 represents a section taken transversely through Fig. 1 on line 2 2. Fig. 3 represents a vertical central section through the lower portion of the check-valve joint and the upper portion of the coupling, with which it is connected in accordance with our improvement. Fig. 4 is an end view of the lower end of the check-valve joint with the packing removed. Fig. 5 is an end view of the lower end of the plunger, which is adapted to engage the check-valve joint in order that the same may when desired be unscrewed from the coupling and be raised from the main well-tube.

In said drawings, A indicates the main well-tube, B the strainer-point, and C a coupling, which at its lower end is connected with the strainer-point and at its upper end screwed into the plunger-cylinder D.

The check-valve joint E is provided with a suitable seat for any desired form of check-valve E', and is at its lower end provided with an externally-threaded neck $e$, adapted to screw into the internally-threaded upper end of the coupling C. The annular packing F is fitted upon the neck with which the check-valve joint is provided at its lower end, and is held at the point of junction between said neck and the main body of the check-valve joint. At this point of junction between the neck and the main body of the check-valve joint the neck is preferably formed with an unthreaded portion which is encircled by the annular packing, whereby the retention of the packing upon the neck is assisted. The check-valve joint is at the point of junction between its neck and its main body portion provided with an annular shoulder, so that when the threaded neck is screwed down into the coupling C the packing can be compressed between the shoulder and the upper end of the coupling, in which way an extremely simple and tight joint or connection between the check-valve joint and the coupling is attained. The annular shoulder with which the check-valve joint is provided at $e'$ is grooved or channeled for the greater portion of its width, so as to provide it with an annular groove $e^2$. (Best illustrated in Figs. 3 and 4.) The packing F should be made of such thickness that when fitted upon the neck $e$ and subjected to considerable pressure a portion of its thickness may be crowded into the annular groove $e^2$, so as to tightly fill the same and yet leave a suitable thickness of packing below the groove, as in Fig. 3, wherein it will be seen that while the groove is filled by a portion of the packing there is a suitable thickness of packing below the groove. The packing thus having a portion of the material of which it is composed wedged into the check-valve joint will be held in connection therewith so firmly as to avoid all possibility of its becoming detached during the operation of detaching the check-valve joint from the coupling. While therefore the upper end of the coupling C provides a seat between which and the shoulder of the check-valve joint the packing will be compressed when the threaded neck of the check-valve joint is screwed down into the coupling, the packing will be securely fitted to the check-valve joint, so that all danger of its being left behind when the check-valve joint is detached from the coupling will be avoided, no matter how much it may tend to stick to the said seat. In this connection it may also be observed that the foregoing arrangement permits said packing to be made of leather in place of the elastic packing more commonly provided at the lower end of the check-valve joint, whereby a more durable packing is provided.

The check-valve joint can be adapted to be engaged by any preferred tool suitable for turning it, so as to unscrew it from the coupling, and for then lifting it out from the well-tube; or the plunger G may have its lower end adapted, as at $g$, Fig. 5, to receive and engage the upper end of the check-valve joint, which last-mentioned matter is, however, well known in the art, and hence not herein particularly described.

What we claim as our invention is—

The combination, substantially as hereinbefore set forth, of the well-tube, the plunger-cylinder D, inclosed within the well-tube, the strainer-point, a coupling C, connected at its lower end with the strainer-point and having its upper end portion threaded both externally and internally, the said externally-threaded portion of the coupling being screwed directly into an internally-threaded lower end portion of the plunger-cylinder, the check-valve joint arranged within the plunger-cylinder and provided with a threaded reduced lower end portion, forming the neck $e$, which engages the internally-threaded upper end portion of the coupling C, and an annular groove $e^2$, formed in the annular shoulder at the junction of the neck $e$ with the body of the check-valve joint, and an annular packing F, arranged within said groove and held upon the upper end of the coupling C, which at said end fits between and engages the externally-threaded neck $e$ of the check-valve joint and the internally-threaded portion of the plunger-cylinder.

ARTHUR CAMERON.
THOMAS G. CHAPMAN.

Witnesses:
CHAS. G. PAGE,
A. DICKINSON.